(12) United States Patent
Niimi

(10) Patent No.: US 6,463,749 B2
(45) Date of Patent: Oct. 15, 2002

(54) AIR-CONDITIONING DEVICE FOR A VEHICLE AND DEVICE FOR CONTROLLING AN ENGINE FOR A VEHICLE

(75) Inventor: Yasuhiko Niimi, Handa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/010,128

(22) Filed: Dec. 7, 2001

(65) Prior Publication Data

US 2002/0069656 A1 Jun. 13, 2002

(30) Foreign Application Priority Data

Dec. 8, 2000 (JP) ......................................... 2000-374288

(51) Int. Cl.[7] ................................................. F25B 49/02
(52) U.S. Cl. ..................................... 62/228.1; 62/323.1
(58) Field of Search ............................ 62/228.1, 228.5, 62/323.1, 323.4

(56) References Cited

U.S. PATENT DOCUMENTS

| | | | | |
|---|---|---|---|---|
| 4,342,199 A | * | 8/1982 | Shaw et al. | 417/310 |
| 4,481,784 A | * | 11/1984 | Elmslie | 62/133 |
| 4,926,651 A | * | 5/1990 | Noguchi | 62/133 |
| 5,018,362 A | * | 5/1991 | Nagase et al. | 62/133 |
| 5,319,944 A | * | 6/1994 | Uehara | 62/228.4 |
| 5,924,296 A | | 7/1999 | Takano et al. | 62/133 |
| 6,035,652 A | * | 3/2000 | Hashimoto | 123/339.17 |
| 6,196,009 B1 | * | 3/2001 | Nishi et al. | 123/339.17 |

FOREIGN PATENT DOCUMENTS

| | | |
|---|---|---|
| JP | A-4-368218 | 12/1992 |
| JP | A-8-312423 | 11/1996 |
| JP | A-11-170858 | 6/1999 |
| JP | A-11-291752 | 10/1999 |

* cited by examiner

*Primary Examiner*—William E. Tapolcai
(74) *Attorney, Agent, or Firm*—Harness, Dickey & Pierce, PLC (57) ABSTRACT

A device for controlling an engine for a vehicle and an air-conditioning device for a vehicle capable of suitably controlling the blow-out rate of an air-conditioning compressor at the time when the fuel supply has been cut by estimating a load torque of the air-conditioning compressor under a condition of resuming the fuel supply. The air-conditioning device for vehicles according to an embodiment of the invention comprises blow-out rate varying means for varying the blow-out rate of the compressor driven by a vehicle engine, and load torque estimating means for estimating a physical quantity related to the load torque of the compressor under a condition of resuming the fuel supply after the fuel supply has been cut. The blow-out rate of the compressor is changed by controlling the blow-out rate varying means depending upon the estimated value of physical quantity.

12 Claims, 9 Drawing Sheets

AIR-CONDITIONING DEVICE FOR A VEHICLE AND DEVICE FOR CONTROLLING AN ENGINE FOR A VEHICLE

BACKGROUND OF THE INVENTION

1. Field of the Invention

The present invention relates to a control device for cutting the supply of fuel to an engine (internal combustion engine) for a vehicle during the deceleration of the vehicle and to a device for controlling the blow-out rate of a compressor in an air-conditioning device mounted on the vehicle equipped with the above control device.

2. Description of the Related Art

In the vehicles, so far, it is an accepted practice to execute the so-called fuel-cut control operation for cutting the supply of fuel to the engine of the vehicle in order to improve the fuel efficiency during the deceleration operation in which the accelerator operation amount (amount the accelerator pedal is depressed) is zero. In order to prevent the vehicle engine from coming into a halt (to prevent the engine stalling), in this case, a predetermined lower-limit rotational speed Neo (e.g., 800 rpm) at which the vehicle engine still continues to run even if the supply of fuel is cut is set as a rotational speed for resetting the cut of fuel supply. The supply of fuel is resumed when the engine rotational speed becomes smaller than the lower-limit rotational speed Neo.

In a vehicle mounting the air-conditioning device, the load exerted on the engine increases by the amount the compressor load torque exerts on the engine when the air-conditioning device is in operation as compared to when it is not in operation. Accordingly, the lower-limit rotational speed Neo for resuming the supply of fuel is set to be higher by a predetermined amount α (e.g., 200 rpm). That is, with the air-conditioning device being in operation, the supply of fuel is resumed when the engine rotational speed becomes smaller than Neo+α (e.g., 1000 rpm).

The above-mentioned value+α has been determined by taking a maximum load torque of the compressor into consideration to reliably prevent the engine stalling. However, an inconvenience that is described below occurs.

That is, in small cooling load conditions, such as in spring and in fall, the compressor needs to blow out the coolant at a low rate (low flow rate per unit time). When the compressor is of the variable capacity type, therefore, the compressor is operated in a low capacity state. The load torque of the compressor varies in proportion to the blow-out capacity. When the compressor is operated in a low capacity state, therefore, the supply of fuel is resumed at a high rotational speed which is Neo+α though the cut of fuel supply can be maintained even at a rotational speed lower than Neo+α, causing the engine to wastefully consume fuel.

Japanese Unexamined Patent Publication (Kokai) No. 8-312423 discloses an art in which a second setpoint rotational speed for resuming the fuel supply in the case that the air-conditioning device is in operation is set to be higher than a first setpoint rotational speed for resuming the fuel supply in the case that the air-conditioning device is not in operation, and the supply of fuel amount to the engine is controlled to be lean when the air-conditioning device is operated with the engine rotational speed lying between the first setpoint rotational speed and the second setpoint rotational speed.

Even according to this prior art, however, the setpoint rotational speed at the time of resuming the fuel supply is increased or decreased depending upon whether the air-conditioning device is in operation or not in operation. Therefore, fuel is wastefully consumed in low cooling load conditions.

SUMMARY OF THE INVENTION

In view of the above-mentioned situation, it is an object of the present invention to provide a device for controlling an engine for a vehicle capable of suitably controlling a period in which the fuel supply is cut by estimating a load torque of an air-conditioning compressor under a condition for resuming the fuel supply.

It is another object of the present invention to provide an air-conditioning, device for a vehicle capable of suitably controlling the blow-out rate of the air-conditioning compressor by estimating a load torque of the air-conditioning compressor under the condition for resuming the fuel supply.

The present invention was contrived in order to accomplish the above objects. An air-conditioning device for a vehicle according to an embodiment of the invention comprises blow-out rate varying means (19) for varying the blow-out rate of a compressor (1) driven by a vehicle engine (4), and load torque estimating means (S400) for estimating a physical quantity related to the load torque of the compressor (1) under a condition of resuming the fuel supply after the fuel supply has been cut, wherein the blow-out rate of the compressor (1) is changed by controlling the blow-out rate varying means (19) depending upon an estimated value of physical quantity output from the load torque estimating means (S400).

This makes it possible, at the time when the fuel supply is cut, to set a suitable blow-out rate of the compressor corresponding to an estimated value of the compressor load torque under the condition of resuming the fuel supply.

Concretely speaking, in this case, the blow-out rate of the compressor (1) can be changed 1̂ by using a variable capacity-type compressor, or 2̂ by using a fixed capacity-type compressor (1) having a constant blow-out rate, by interposing a speed-change apparatus, between the compressor (1) and the vehicle engine (4), of which the speed-change ratio can be controlled by a control signal from an external unit, and by changing the rotational speed of the compressor (1) by changing the speed-change ratio of the speed-change apparatus.

It is further allowable to set a reference value related to load torque of the compressor (1) under the condition of resuming the fuel supply and to vary the blow-out rate of the compressor (1) so that the estimated value of physical quantity approaches the reference value.

According to this method, if the reference value of the compressor load torque is set to be a limit value at which the operation characteristics of the vehicle engine (4) are still maintained in a favorable zone, then the blow-out rate of the compressor is changed so that the compressor load torque under the condition of resuming the fuel supply approaches the limit value at which the engine operating characteristics are still maintained in the favorable zone.

Therefore, when there is a margin in the engine output while maintaining the engine operation characteristics in the favorable zone, the blow-out rate of the compressor is increased to increase the cooling ability in the refrigeration cycle in order to increase the effect of recovering energy during the deceleration.

The above reference value may be the load torque of the compressor at the time of resuming the fuel supply under the condition of a maximum air-conditioning load.

In the air-conditioning device for vehicles according to another embodiment of the invention, a reference value related to load torque of the compressor (1) is set under the condition of resuming the fuel supply, and the blow-out rate of the compressor (1) during the control operation for cutting the fuel supply is increased to be larger than the blow-out rate at the time when the control operation for cutting the fuel supply is started in the case that the estimated value of physical quantity output from load torque estimating means (S400) is smaller than the reference value, and the blow-out rate of the compressor (1) during the control operation for cutting the fuel supply is decreased to be smaller than the blow-out rate at the time when the control operation for cutting the fuel supply is started in the case that the estimated value of physical quantity is larger than the reference value.

This makes it possible to maintain the engine operation characteristics in the favorable zone as well as to increase the effect of recovering energy during the deceleration by increasing the blow-out rate of the compressor.

In the case that the estimated value of physical quantity is smaller than the reference value, the blow-out rate of the compressor (1) during the control operation for cutting the fuel supply may be forcibly brought to be a maximum blow-out rate.

The load torque estimating means (S400) is capable of estimating the physical quantity based upon the physical quantity related to the load torque of the compressor (1) and the rotational speed of the compressor (1) at the time when the control operation for cutting the fuel supply is started, and upon the rotational speed of the compressor (1) under the condition of resuming the fuel supply.

Described below is the method for estimating the load torque. Deceleration of the vehicle continues for only a short period of time and, hence, the time for cutting the fuel supply inevitably becomes short. During this period, therefore, it is considered that the air-conditioning thermal load is maintained constant. While the control operation for cutting the fuel supply is executed, therefore, the blow-out rate of the compressor is maintained constant from the standpoint of the air-conditioning thermal load. By utilizing this relationship, it is possible to accurately estimate the load torque of the compressor under a condition of resuming the fuel supply from the compressor dynamic condition (torque and rotational speed) at the time when the control operation for cutting the fuel supply is started and from the rotational speed of the compressor under the condition for resuming the fuel supply.

Here, the timing for starting the control operation for cutting the fuel supply is not strictly limited to only a timing for starting the cut of the fuel supply, but may be just before or just after when the fuel supply is cut.

Here, further, the condition for resuming the fuel supply may concretely be a timing of when the rotational speed of the vehicle engine (4) has dropped down to a predetermined rotational speed after the fuel supply has been cut.

A further embodiment of the present invention is concerned with a device for controlling an engine for a vehicle which cuts the fuel supply to a vehicle engine (4) under a predetermined condition during the deceleration of the vehicle, and which mounts an air-conditioning device having a compressor (1) that is driven by the vehicle engine (4), compresses the coolant in a refrigerating cycle and blows the coolant out, the device for controlling the engine for a vehicle comprising:

load torque estimating means (S400) for estimating a physical quantity related to the load torque of the compressor (1) under a condition for resuming the fuel supply; and fuel supply resumption control means (S700a) for changing the timing for resuming the fuel supply depending upon the estimated value-of physical quantity output from the load torque estimating means (S400).

This makes it possible to suitably control the period in which the fuel supply is cut by estimating the load torque of the air-conditioning compressor under the condition for resuming the fuel supply and by suitably determining the timing for resuming the fuel supply (the timing for resetting the cut of fuel supply).

The reference value related to load torque of the compressor (1) is set under the condition for resuming the fuel supply, and in the case that the estimated value of physical quantity is smaller than the reference value, the timing for resuming the fuel supply may be delayed so that the operation characteristics of the vehicle engine (4) approach a border line between the defective zone (D) and the favorable zone (E).

When the estimated value related to the load torque of the compressor is smaller than the reference value, i.e., when there is still a margin in the engine output, therefore, the timing for resuming the fuel supply is delayed to lengthen the period in which the fuel supply remains cut, in order,to decrease the consumption of fuel without deteriorating the engine operation characteristics.

The above reference value may be the load torque of the compressor at the time of resuming the fuel supply under the condition of a maximum air-conditioning load. in a device for controlling an engine for a vehicle according to a still further embodiment of the present invention, a reference value related to load torque of the compressor (1) is set under the condition of resuming the fuel supply, the timing for resuming the fuel supply is delayed behind the timing that is set based on the reference value when the estimated value of physical quantity is smaller than the reference value, and the timing for resuming the fuel supply is advanced ahead of the timing that is set based on the reference value when the estimated value of physical quantity is larger than the reference value.

Namely, when the estimated value related to load torque of the compressor is smaller than the reference value, the timing for resuming the fuel supply is delayed to lengthen the period for cutting the fuel supply, in order to decrease the consumption of fuel. When the estimated value related to load torque of the compressor is larger than the reference value, on the other hand, the timing for resuming the fuel supply is advanced to avoid deterioration in the engine operating characteristics in advance.

The load torque estimating means (S400) can estimate the physical quantity based upon the physical quantity related to the load torque of the compressor (1) and the rotational speed of the compressor (1) at the time when the control operation for cutting the fuel supply is started and upon the rotational speed of the compressor (1) under the condition of resetting the cut of fuel supply.

Then, as described earlier, it is possible to accurately estimate the load torque of the compressor under the condition of resuming the fuel supply from the dynamic conditions of the compressor (torque and rotational speed) at the time when the control operation for cutting the fuel supply is started and from the rotational speed of the compressor under the condition for resuming the fuel supply.

Numerals in parentheses in the above-mentioned means are to represent correspondence to concrete means described in the embodiments appearing later.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

First Embodiment

Figure 1:
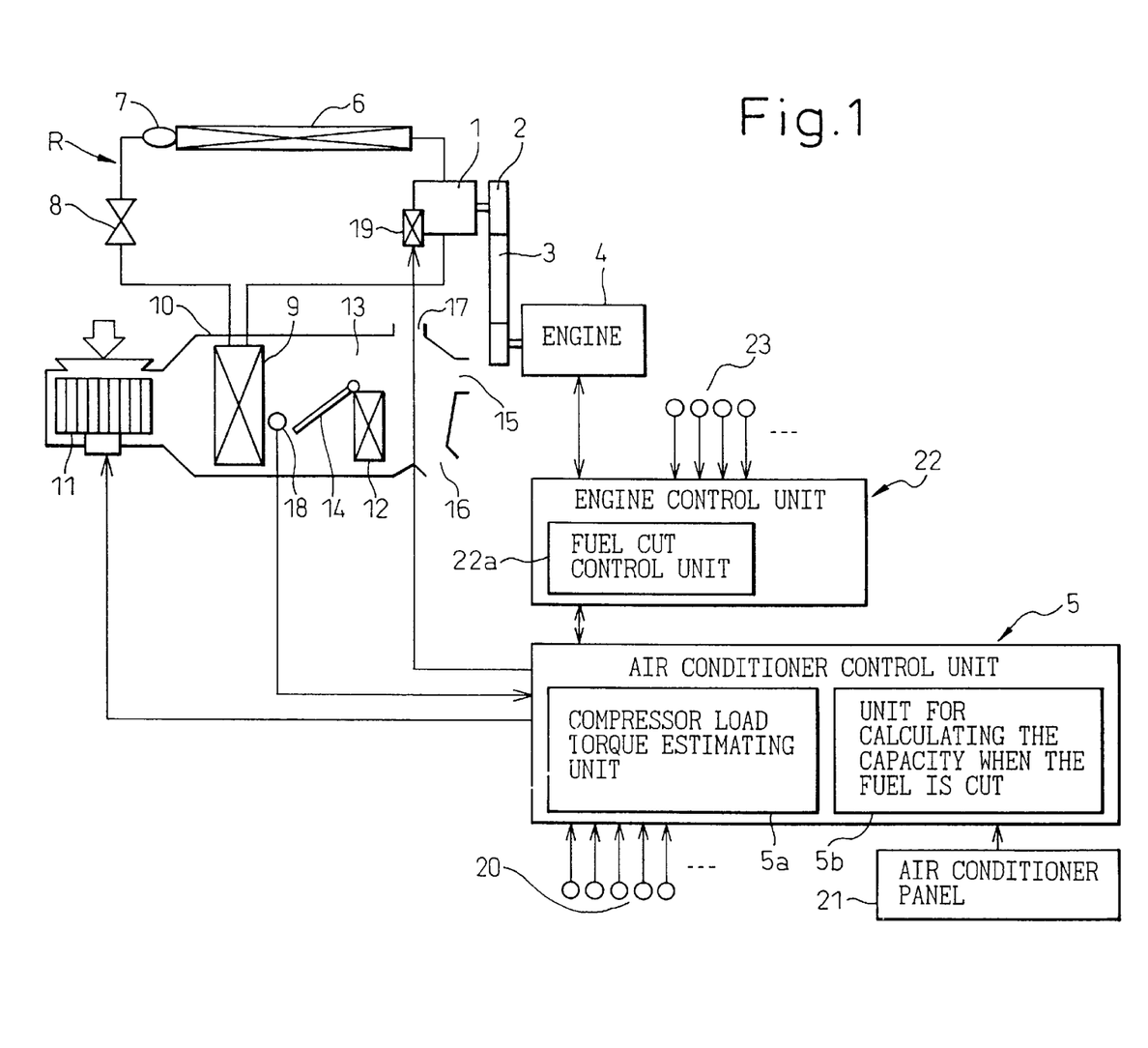
FIG. 1 is a diagram illustrating the whole constitution of a first embodiment of the present invention.

FIG. 1 is a diagram illustrating the whole constitution according to a first embodiment of the present invention. A refrigeration cycle R of an air-conditioning device for vehicles includes a compressor 1 which takes in, compresses and blows out the coolant. The motive power of a vehicle engine 4 is transmitted to the compressor 1 through a pulley 2 and a belt 3.

As is widely known, the vehicle engine 4 further drives auxiliary devices such as a generator, a hydraulic pump for driving the power-assisted steering system and a cooling water pump, in addition to driving the air-conditioning compressor 1, through power transmission means such as a belt.

In the refrigeration cycle R, the superheated gaseous coolant of a high temperature and of a high pressure blown out from the compressor 1 flows into a condenser 6 where the coolant is cooled and condensed upon exchanging the heat with the external air blown by a cooling fan that is not shown. The coolant condensed through the condenser 6, then, flows into a liquid receiver 7 where the coolant is separated into a gas and a liquid, and the excess coolant (liquid coolant) in the refrigeration cycle R is stored in the liquid receiver 7.

The liquid coolant from the liquid receiver 7 is reduced in pressure through an expansion valve (pressure-reducing means) 8 to assume a two-phase state of a gas and a liquid at low pressure. The low-pressure coolant from the expansion valve 8 flows into an evaporator (heat exchanger for cooling) 9. The evaporator 9 is installed in an air-conditioner casing 10 of the air-conditioning device for a vehicle, and the low-pressure coolant that flows into the evaporator 9 evaporates upon absorbing heat from the air in the air-conditioner casing 10. The outlet of the evaporator 9 is coupled to the intake side of the compressor 1 and, thereby, a closed circuit is constituted by the above-mentioned parts constituting the cycle.

The air-conditioner casing 10 constitutes an air duct for the conditioned air. In the air-conditioner casing 10, a blower 11 is disposed on the upstream of the evaporator 9. An internal air/external air change-over box (not shown) is disposed on the intake side of the blower 11 (upper side in FIG. 1). The air (internal air) in the compartment or the air (external air) outside the compartment, which is taken in from the internal air/external air change-over box, is blown by the blower 11 into the air-conditioner casing 10.

On the downstream of the evaporator 9 in the air-conditioning case 10, there is installed a hot water-type heater core (heat exchanger for heating) 12 for heating the air using the hot water (cooling water) of the vehicle engine 4 as a heat source. A by-pass 13 is formed by the side of the hot water-type heater core 12. The rate of mixing the hot air passing through the hot water-type heater core 12, and the cool air passing through the by-pass 13 is adjusted by using an air-mixing door 14. The air-mixing door 14 constitutes temperature-adjusting means for adjusting the temperature of the air blown into the compartment by adjusting the ratio of the cool air and the hot air.

On the downstream end of the air-conditioner casing 10, there are formed a face blow-out port 15 for blowing out the air onto the upper parts of the occupants in the compartment, a foot blow-out port 16 for blowing out the air onto the feet of the occupants in the compartment, and a defroster blow-out port 17 for blowing out the air onto the inner surface of the front windshield. These blow-out ports 15 to 17 are hanged-over and are opened and closed by blow-out mode doors that are not shown. The air-mixing door 14 and the blow-out mode doors are driven by electric drive means such as a servo motor via a linking mechanism.

An evaporator blow-out temperature sensor (means for detecting the cooling degree of the evaporator) 18 constituted by a thermistor, is disposed in the air-conditioner casing 10 at a position where the air is just blown out from the evaporator 9.

In this embodiment, the compressor 1 is an externally capacity-variable compressor which varies the blow-out capacity depending upon a control signal from an external unit. The externally capacity-variable compressor 1 is a known one. For example, it is a swash plate-type compressor equipped with a capacity varying device 19 having an electromagnetic pressure controller that controls the pressure in the swash plate chamber by utilizing a blow-out pressure and an intake pressure. By controlling the pressure in the swash plate chamber, the angle of inclination of the swash plate is varied to continuously change the stroke of the piston, i.e., to continuously change the blow-out capacity of the compressor over a range of nearly from 0% to 100%.

Figure 2:
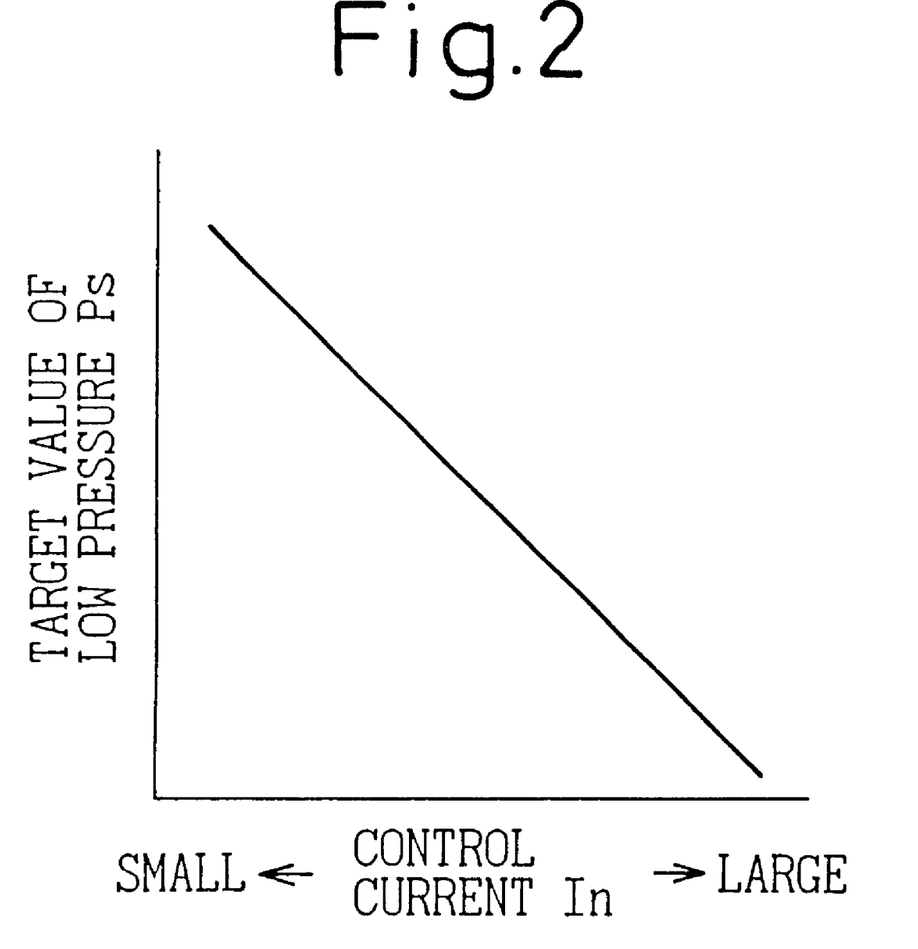
FIG. 2 is a diagram of control characteristics of a variable capacity-type compressor according to the first embodiment.

The electric current to the capacity varying device 19 is controlled by an air conditioner control unit 5. For example, the blow-out capacity of the compressor changes toward the increasing direction with an increase in the control current In that flows into the capacity varying device 19. That is, the control current In flowing into the capacity varying device 19 directly determines a target value of a low pressure Ps in the refrigeration cycle. The target value of the low pressure Ps decreases in inverse proportion to an increase in the control current In as shown in FIG. 2. Therefore, the blow-out capacity of the compressor changes in the increasing direction with an increase in the control current In.

It is therefore possible to increase or decrease the low pressure Ps by increasing or decreasing the control current In (by increasing or decreasing the blow-out capacity of the compressor 1) for controlling the cooling ability of the evaporator 9 so that the temperature of the evaporator 9 (temperature of the air blown out from the evaporator) becomes a predetermined target temperature (that corresponds to a target value of the low pressure Ps). This makes it possible to execute such control operations as preventing the evaporator 9 from freezing, saving power consumed by the compressor 1, etc.

Here, concretely speaking, the control current In is varied by controlling the duty ratio. The control current In, however, may be directly increased or decreased without relying upon controlling the duty ratio.

In this embodiment, the compressor 1 is capable of decreasing the blow-out capacity down to about 0%. Therefore, there is provided no electromagnetic clutch for connecting or disconnecting the compressor 1. It is, however, also possible to provide the compressor 1 with an electromagnetic clutch in order to discontinue the operation of the compressor 1 by cutting the flow of electric current to the electromagnetic clutch when the blow-out capacity has decreased down to nearly 0%.

The air conditioner control unit 5 receives detection signals from a group of known sensors 20 that detect internal air temperature, external air temperature, amount of sunshine, temperature of the engine cooling water (hot water), for controlling the air conditioner, in addition to receiving the signal from the above-mentioned sensor 18. Further, operation signals are input from a group of operation switches on an air conditioner control panel 21 installed near the instrument panel in the compartment. The air conditioner control unit 5 includes a compressor load torque estimating unit 5a that will be described later and a unit 5b for calculating the compressor capacity when the fuel supply to the vehicle engine 4 is cut.

Further, the air conditioner control unit 5 is connected to the engine control unit 22 on the vehicle side, and the signals are input and output between these two control units 5 and 22. As is well known, the engine control unit 22 totally controls the amount of fuel injection into the vehicle engine 4 and the ignition timings based upon the signals from the group of sensors 23 that detect the operation conditions of the vehicle engine 4. The engine control unit 22 is equipped with a fuel cut control unit 22a that will be described later.

The air conditioner control unit 5 and the engine control unit 22 are constituted by a common microcomputer or separate microcomputers and the peripheral circuits thereof.

Figure 3:
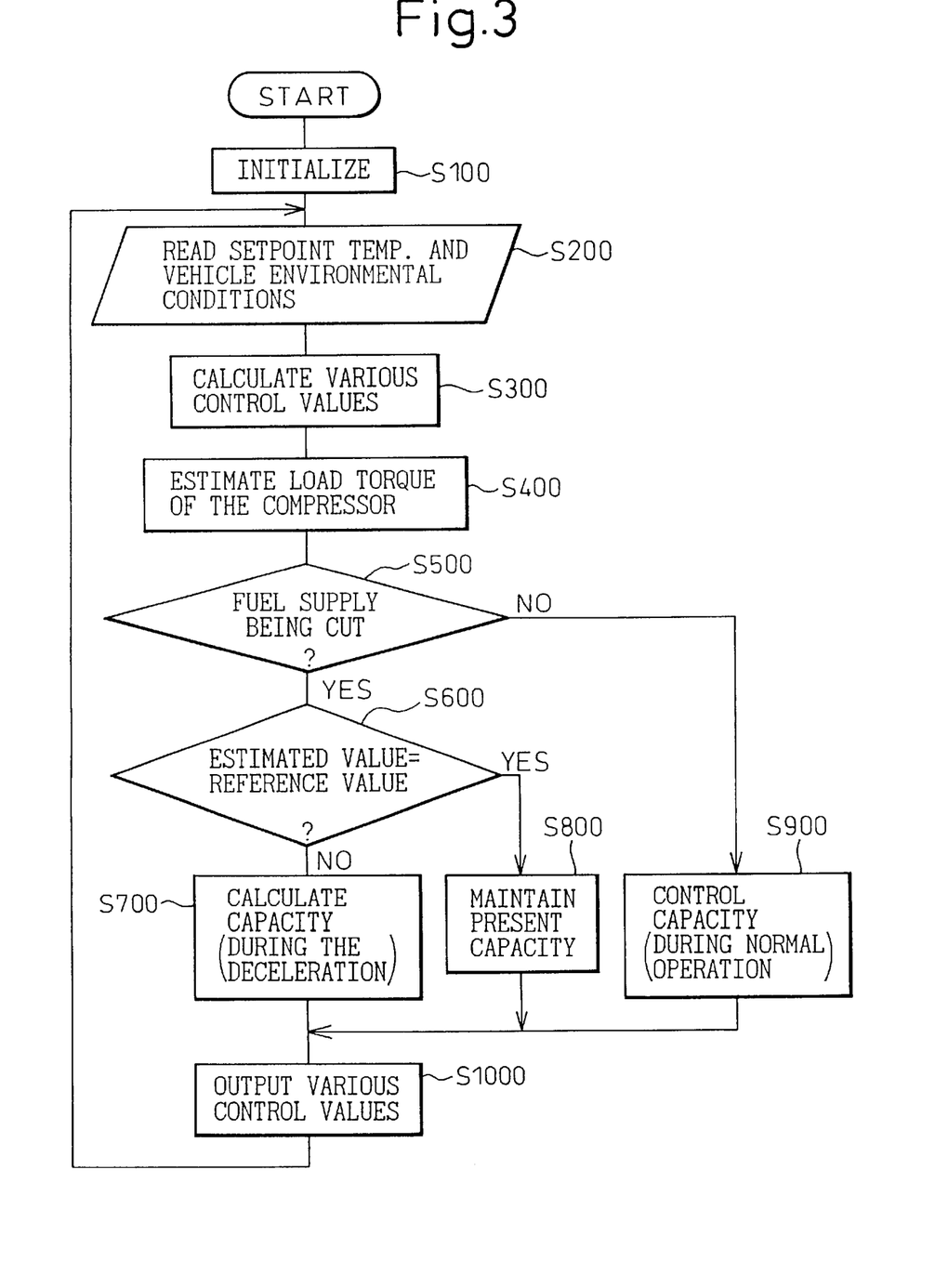
FIG. 3 is a flowchart illustrating the air-conditioning control operation according to the first embodiment.

Next, described below is the operation of the first embodiment. FIG. 3 is a flowchart illustrating a basic air-conditioning control operation by the air conditioner control unit 5. At step S100, a timer and a control flag, etc. are initialized. Then, at step S200, various signals are read in.

Concretely speaking, the air conditioner control unit 5 reads an evaporator blow-out temperature TE from the sensor 18, sensor signals such as internal air temperature TR, external air temperature TAM, amount of sunshine TS and engine cooling water temperature TW from the group of sensors 20, as well as operation signals (setpoint temperature Tset, etc.) from the group of operation switches on the air conditioner control panel 21. By the communication between the air conditioner control unit 5 and the engine control unit 22, further, a preset engine rotational speed Ne1 corresponding to the accelerator pedal operated by the occupant, a fuel supply cut signal FC, and a threshold value Neo for resetting the cut of fuel supply, i.e., for judging the resumption of fuel supply are read in.

Here, the fuel supply cut signal FC is output from the fuel cut control unit 22a during the deceleration of the vehicle in which the amount of accelerator operation is zero. The threshold value Neo for judging the resumption of fuel supply is a setpoint value that has been set in advance, and is output from the fuel cut control unit 22a.

Figure 4:
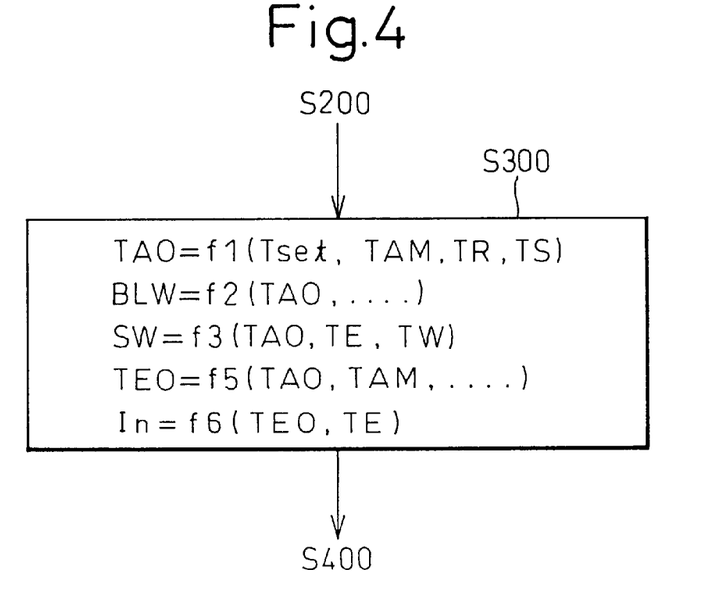
FIG. 4 is a diagram concretely illustrating the content of control operation of part of FIG. 3.

Then, a variety of control values are calculated (generated) at step S300 to automatically control the air conditioning. The control values may be calculated in a manner that has been known. If simply described, therefore, FIG. 4 schematically illustrates the calculating operation at step S300 in which a target blow-out temperature TAO is a temperature of the air blown into the compartment to maintain the interior of the compartment at a setpoint temperature Tset set by the occupant irrespective of a change in the air-conditioning thermal load. The target blow-out temperature TAO is calculated based upon the setpoint temperature Tset, external air temperature TAM, internal air temperature TR and the amount of sunshine TS.

A target blow rate BLW of the blower 11 is calculated based on TAO, and a target opening degree SW of the air-mixing door 14 is calculated based on TAO, evaporator blow-out temperature TE, and engine cooling water temperature TW. Further, a target blow-out temperature TEO of the evaporator 9 is calculated based upon TAO, TAM, etc. The control current In for the capacity varying device 19 is so calculated that the real evaporator blow-out temperature TE is maintained at the target evaporator blow-out temperature TEO. In this embodiment, the control current In and the low pressure Ps in the refrigeration cycle have a relationship as shown in FIG. 2; i.e., the low pressure Ps in the refrigeration cycle decreases with an increase in the control current In.

Next, the routine proceeds to step S400 where the condition for resetting the fuel cut during the deceleration of the vehicle is predicted, i.e., the load torque of the compressor 1 at the time of resuming the fuel supply is estimated. Here, the estimation of the load torque will be described in detail. Deceleration of the vehicle generally lasts for only a very short period of time. For the air-conditioning device for the vehicle, therefore, the air-conditioning thermal load during the deceleration of the vehicle does not substantially change. Therefore, the load torque of the compressor 1 at the moment of resuming the fuel supply can be estimated from the operation condition of the refrigeration cycle at a moment when the vehicle has started decelerating.

That is, the load torque of the compressor 1 has a correlation to the pressure differential between the high pressure Ph and the low pressure Ps in the refrigeration cycle. The larger the differential between the high pressure and the low pressure (Ph–Ps), the larger the load torque of the compressor 1.

Figure 5:
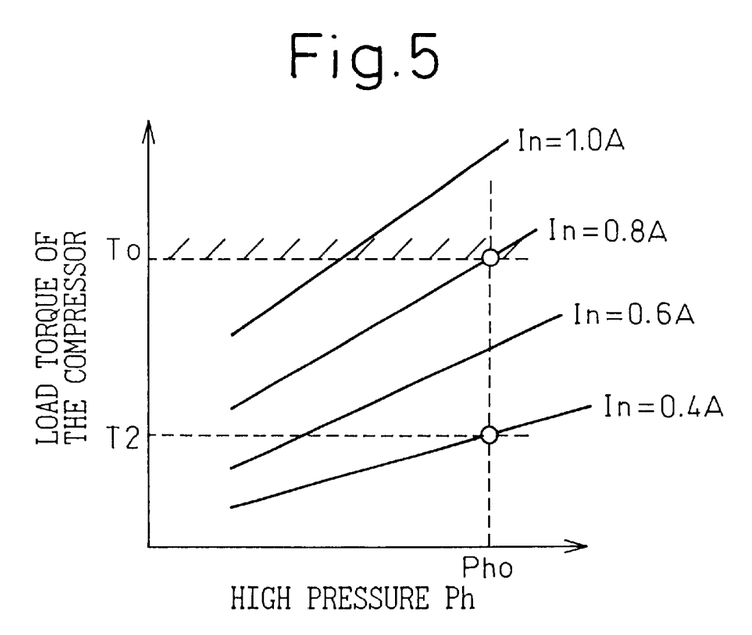
FIG. 5 is a diagram of characteristics illustrating a relationship among the load torque of the compressor, the high pressure and the capacity control current.

FIG. 5 is a diagram of characteristics illustrating relationships among the high pressure Ph in the refrigeration cycle, the control current In for the capacity varying device 19 and the load torque of the compressor 1. This diagram is prepared based upon the experimental data measured by really operating the refrigeration cycle or based upon the results of computer simulation, and is stored in advance in a ROM of a microcomputer in the air conditioner control unit 5.

As described above, the low pressure Ps in the refrigeration cycle decreases with an increase in the control current In. Therefore, the load torque of the compressor 1 increases with an increase in the control current In or with an increase in the high pressure Ph. The compressor rotational speed condition of FIG. 5 is the compressor rotational speed corresponding to the engine rotational speed Neo used as a threshold value for judging the resumption of fuel supply.

Figure 6:
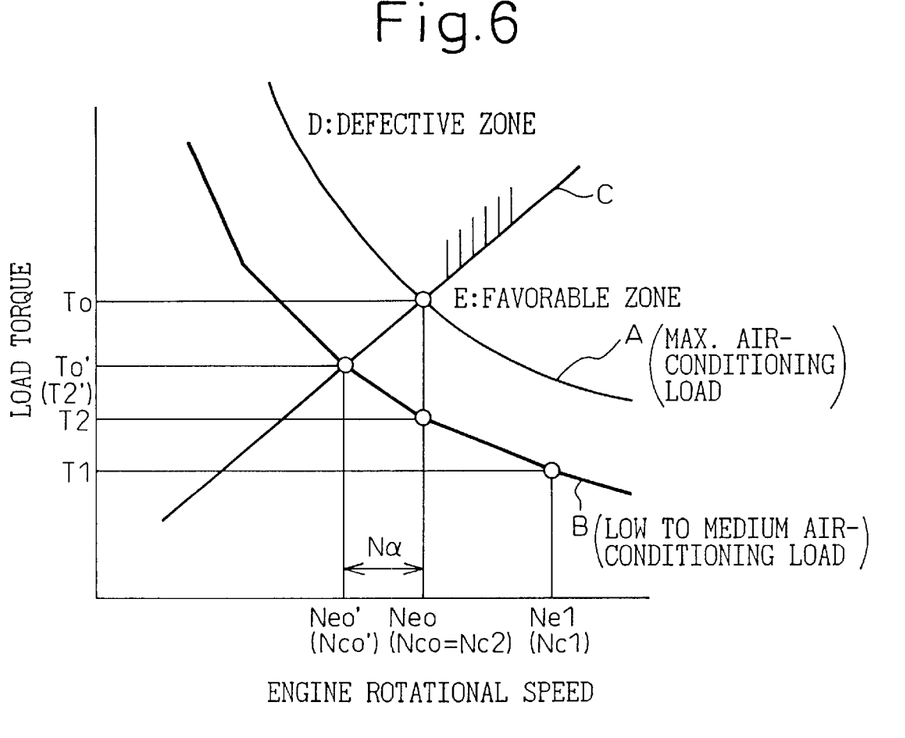
FIG. 6 is a diagram of characteristics illustrating a relationship between the load torque of the compressor and the engine rotational speed (compressor rotational speed)

Next, described below with reference to FIG. 6 is how to determine the engine rotational speed Neo as the threshold value for judgment. In FIG. 6, lines A and B are equidynamic lines of the compressor along which the products of the torque and the rotational speed of the compressor 1 remain constant, the line A representing the product of when the air-conditioning thermal load is a maximum and the line B representing the product of when the air-conditioning thermal load is smaller than a maximum load by a predetermined amount (during low to medium load).

A line C is a border line for separating the defective zone D from the favorable zone E in the operation characteristics of the vehicle engine 4. Here, the operation characteristics defective zone D is a region where the engine may stall or the NVH characteristics are deteriorated, and the favorable zone E is a region where the engine does not stall and the NVH characteristics are not deteriorated. As is widely known, the NVH characteristics are the operation characteristics evaluated from the standpoint of noise (N), vibration (V) and comfortableness (H).

The engine rotational speed for resuming the fuel supply is Neo from an intersecting point of the line A and the line C so that the engine operation characteristics will not enter into the defective zone D even when the air-conditioning thermal load becomes a maximum. From the intersecting point of the lines A and C, a reference load torque of the compressor corresponding to Neo becomes To.

At a moment when the load torque of the compressor is estimated at step S400, if the engine rotational speed is Ne1 and the air-conditioning thermal load is low to medium load, the rotational speed Ne1 is applied to the equidynamic line B of the compressor to find that the load torque of the compressor is T1. Then, the real load torque of the compressor at Neo when the fuel supply is resumed increases to T2 due to the characteristics of the line B. That is, the engine rotational speed decreases from Ne1 down to Neo and the compressor rotational speed decreases from Nc1 corresponding to Ne1 down to Nco corresponding to Neo, whereby the blow-out capacity of the compressor increases by an amount that corresponds to a decrease in the rotational speed, and the load torque of the compressor increases from T1 to T2.

The calculating operation at step S400 is to estimate the real load torque T2 of the compressor at Neo at the time of resuming the fuel supply from the diagram of characteristics of FIG. 5.

In FIG. 5, the high pressure Ph on the abscissa is detected by a pressure sensor for detecting the high pressure, which is among the group of sensors 20. From the characteristics of FIG. 5, when Ph=Pho at a moment of estimating the load torque and when the control current In calculated at step S300 is 0.4 A, it is estimated from an intersecting point of the characteristic line of the control current In=0.4 A and Pho that the load torque of the compressor at the engine rotational speed Neo at the time of resuming the fuel supply is T2.

The diagram of characteristics (control map) of FIG. 5 illustrate characteristics at the engine rotational speed Neo at the time of resuming the fuel supply. As will be understood from the characteristics of the equidynamic lines of the compressor of FIG. 6, however, there exists a relation of inverse proportion between the load torque of the compressor and the engine rotational speed when there is a diagram of load torque characteristics of the compressor at another engine rotational speed corresponding to FIG. 5, therefore, the load torque of the compressor found from another diagram of characteristics may be multiplied by a rotational speed ratio of the another engine rotational speed and the engine rotational speed Neo at the time of resuming the fuel supply, in order to estimate the load torque of the compressor at the engine rotational speed Neo at the time of resuming the fuel supply. Namely, the load torque of the compressor at Neo is estimated from the idea based on a formula (1) appearing later.

After the load torque of the compressor is estimated at step S400 as described above, the routine proceeds to step S500 where it is judged from a fuel supply cut signal FC whether the fuel supply to the vehicle engine 4 is being cut. Here, the fuel supply cut signal FC is output from the fuel cut control unit 22a during the deceleration of the vehicle where the amount of accelerator operation is zero. When the engine rotational speed decreases down to a threshold value Neo for judgment, the fuel supply cut signal FC is turned off, and the cut of fuel supply is reset, i.e., the fuel supply is resumed.

When the fuel supply is being cut at step S500, the routine proceeds to step S600 where it is judged whether the above-mentioned estimated value (e.g., T2) of load torque of the compressor is in consistent with the above-mentioned reference value To (FIG. 6). Here, the reference value To is not strictly a single point but lies over a range which is wide to a certain degree. Further, the estimated value is a value that is updated last and can virtually be regarded to be a value at the time when the operation for cutting the fuel supply was started.

When the estimated value of load torque of the compressor is not consistent with the reference value To, an independent operation is executed at step S700 for controlling the capacity while the fuel is being cut during the deceleration. Concretely speaking, when the estimated value like T2 is smaller than the reference value To, the control current In corresponding to the reference value To is selected from the diagram of characteristics of FIG. 5. That is, when Ph=Pho as described above, In=0.8 A is selected from an intersecting point of Pho and To. Then, the target value of low pressure Ps decreases from the characteristics of FIG. 2, and the blow-out capacity of the compressor increases.

That is, when estimated value<reference value To at the time of resuming the fuel supply, there is a margin in the output torque of the engine 4. In this case, therefore, the load torque of the compressor (i.e., blow-out capacity) is increased up to a level of the reference value To that corresponds to a maximum torque permitted under the engine operation characteristics. An increase in the load torque of the compressor (i.e., blow-out capacity) up to the level of the reference value To makes it possible to recover energy during the deceleration, to increase the coolant blow-out rate of the compressor and to increase the cooling ability of the refrigeration cycle (evaporator 9).

It is therefore allowed to forcibly lower the temperature of the evaporator during the deceleration to obtain the effect for accumulating the coolness. When the normal traveling is resumed after the deceleration, therefore, the period is extended in which the coolant blow-out rate of the compressor is maintained small, the compressor is driven with a decreased force, and the fuel efficiency is improved.

When the estimated value exceeds the reference value To due to any particular cause that usually does not occur, the control current In is pulled down to a level corresponding to the reference value To. This avoids, in advance, an occurrence that the engine operation characteristics enter into the defective zone D of FIG. 5 due to an excess of load torque of the compressor while the fuel supply is being cut, causing the engine to stall or deteriorating the NVH characteristics.

As described above, an independent operation is executed at step S700 for controlling the capacity while the fuel supply is being cut during the deceleration. Accordingly, the engine operation characteristics (driveability) are not deteriorated by the cut of fuel supply and the fuel efficiency is improved.

On the other hand, when the estimated value of load torque of the compressor is consistent with the above-mentioned reference value To at step S600, the routine proceeds to step S800 to maintain the present capacity control. That is, the coincidence between the estimated value and the reference value To means that the present state of controlling the capacity is adapted to the condition at the time of resuming the fuel supply. Therefore, the current In for controlling the capacity is maintained unchanged.

When it is judged at step S500 that the fuel supply is not being cut, the routine proceeds to step S900 where the capacity control during the normal operation is selected, i.e., the capacity is controlled by the control current In calculated at step S300. Concretely speaking, when TE becomes greater than TEO, the control current In is increased to increase the blow-out capacity and to lower the low pressure Ps. Conversely, when TE becomes smaller than TEO, the control current In is decreased to decrease the blow-out capacity and to increase the low pressure Ps. Therefore, the blow-out capacity is controlled so that the real evaporator blow-out temperature TE is maintained at the target evaporator blow-out temperature TEO.

At step S1000, various control values at step S300 and the control current In finally determined at steps S700 to S900 are output to various devices to automatically control the air conditioning (to control the capacity of the compressor 1, to control the blow rate of the blower 11, to control the opening degree of the air-mixing door 14, etc.).

As will be understood from the diagram of characteristics of FIG. 5, the control current In under the high pressure Ph=Pho can be directly found as In=0.8 A from the intersecting point of To and Pho. Accordingly, the control operations of steps S600 to S800 can be combined together to control the capacity while the fuel supply is being cut.

Further, the estimation of the load torque of the compressor at step S400 may, in effect, be executed at a moment when the fuel supply is going to be cut. It is therefore allowable to estimate the load torque of the compressor at step S400 after it is judged at step S500 that the fuel supply is being cut.

Second Embodiment

Figure 7:
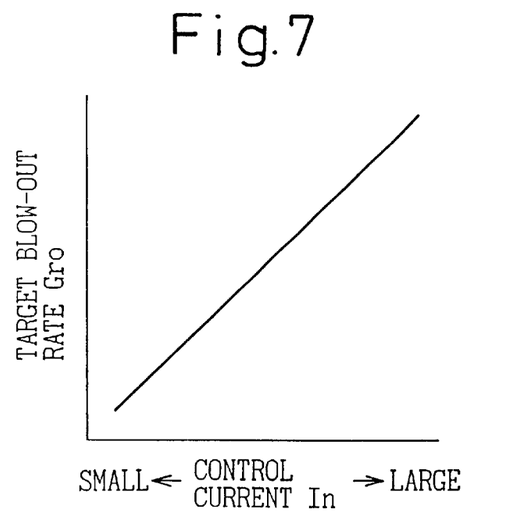
FIG. 7 is a diagram of control characteristics of the variable capacity-type compressor according to a second embodiment.

The first embodiment employed the externally capacity-variable compressor 1 (of the low pressure control type) capable of increasing or decreasing the blow-out capacity so that the low pressure Ps is maintained at a target value of low pressure Ps that is set as shown in FIG. 2 by the control current In that flows into the capacity varying device 19. The second embodiment employs the externally capacity-variable compressor 1 (of the blow-out rate control type) capable of increasing or decreasing the blow-out capacity so that the blowlout rate of the compressor (flow rate per unit time) is maintained at a target flow rate Gro that is set as shown in FIG. 7 by the control current In that flows into the capacity varying device 19.

If described more concretely, the externally capacity variable compressor 1 of the blow-out rate control type according to the second embodiment is provided with a throttle unit on the blow-out side. The pressure differential occurring between before and after the throttle unit has a proportional relationship to the blow-out rate. Therefore, if the blow-out capacity is increased or decreased so that the pressure differential occurring between before and after the throttle unit becomes equal to a target pressure differential, then, the blow-out rate of the compressor is maintained at the target flow rate Gro.

Therefore, the volume varying device 19 is provided with an electromagnetic mechanism of which the electromagnetic force is determined by the control current In, and the electromagnetic force corresponding to the target pressure differential is determined by the electromagnetic mechanism. The capacity varying device 19 is further provided with a valve mechanism which increases or decreases the valve opening degree relying upon a balance between the electromagnetic force corresponding to the target pressure differential and the force due to the pressure differential occurring between before and after the throttle unit.

By controlling the pressure in the swash plate chamber relying upon the increase or decrease in the opening degree of the valve mechanism, it is allowed to vary the angle of inclination of the swash plate and to continuously vary the blow-out capacity of the compressor over a range of from about 0% up to 100%.

In the externally capacity-variable compressor 1 of the blow-out rate control type, if there is no change in the thermal load condition of the vehicle or in the setpoint temperature Tset that is set by the occupant, the target flow rate Gro is maintained constant. In the region where the capacity can be varied, therefore, the blow-out rate of the compressor is maintained constant irrespective of a change in the rotational speed. That is, when the compressor rotational speed decreases, the blow-out capacity of the compressor increases to maintain the blow-out rate constant. In particular, the deceleration of the vehicle takes place for only a short period of time, and a change in the thermal load condition of the vehicle is negligibly small. It can therefore be considered that the blow-out rate of the compress or remains constant during the deceleration of the vehicle.

The blow-out rate of the compressor is determined by blow-out capacity×rotational speed, and there is a one-to-one relationship between the blow-out capacity and the load torque of the compressor. Therefore, if the load torque of the compressor at a moment of estimating the load torque of the compressor (at a moment when the fuel cut is started for the deceleration of the vehicle) is denoted by T1, the compressor rotational speed corresponding to the engine rotational speed N1 at that moment is denoted by Nc1, the compressor rotational speed corresponding to the engine rotational speed Neo at a moment when the fuel supply is resumed is denoted by Nco, and the estimated load torque at that moment is denoted by T2, then, the following formula (1) holds, $$T1 \times Nc1 = Nc0 \times T2 \rightarrow T2 = T1 \times (Nc1/Nc0) \qquad (1)$$

In the above formula (1), N1 and Nco are known data obtained by communication with the engine control unit 22. The load torque T1 is obtained from an output of a sensor that directly detects the load torque of the compressor or is indirectly estimated from the operation conditions of the refrigeration cycle.

Here, the sensor which directly detects the load torque of the compressor may be a distortion detector element which converts the distortion in the shearing direction caused by the torque in the compressor rotary shaft into a change in the electric characteristics. As a method of indirectly estimating the load torque of the compressor, there can be exemplified a method of estimating the load torque of the compressor based upon a difference between the high pressure and the low pressure in the refrigeration cycle, etc. as described earlier.

According to the second embodiment as described above, the load torque of the compressor at a moment of resuming the fuel supply at step S400 in FIG. 3 can be estimated in compliance with the above-mentioned formula (1).

According to the second embodiment, further, the operation for controlling the capacity at step S700 in FIG. 3 is executed in the manner described below.

Namely, with the externally capacity-variable compressor 1 of the blow-out rate control type of the second embodiment, the blow-out rate Gr of the compressor remains constant during a short period of time of deceleration of the vehicle and varies in proportion to the control current In as shown in FIG. 7. At the time of cutting the fuel supply due to the deceleration of the vehicle and at the time of resuming the fuel supply, therefore, the control currents In can be expressed by the following formula (2), $$In1 \propto Gr1 \propto (T1 \times Nc1) \quad (2)$$

$$In2 \propto Gr2 \propto (T2 \times Nc2)$$

$$Gr1 = Gr2$$

In the above formula (2), a suffix "1" represents a timing of cutting the fuel supply and a suffix "2" represents a timing of resuming the fuel supply. Therefore, Nc2 assumes the same value as Nco in the formula (1).

From the formula (2), the control current In2 for controlling the capacity at the time of resuming the fuel supply can be expressed as given by the following formula (3), $$In2=In1\times(T2\times Nc2)/(T1\times Nc1) \quad (3)$$

Here, the load torque of the compressor at the time when the cut of fuel supply is reset can be increased up to the reference value To which is a maximum allowable value. Therefore, the control current In0 for equalizing the estimated value T2 of load torque of the compressor at the time of resuming the fuel supply to the reference value To, is expressed as given by the following formula (4), $$In0=In1\times(T0\times Nc2)/(T1\times Nc1) \quad (4)$$

According to the second embodiment, when the estimated value T2 of load torque of the compressor at the time of resuming the fuel supply is smaller than the reference value To in controlling the capacity at step S700 in FIG. 3, the control current In is increased up to a level of In0 to increase the blow-out capacity thereby to increase the blow-out rate Gr of the compressor. In case the estimated value T2 exceeds the reference value To due to some particular cause, the control current In is decreased down to a level of In0 to decrease the blow-out capacity thereby to decrease the blow-out rate Gr of the compressor.

By controlling the capacity as described above, the second embodiment also exhibits the same function and effect as those of the first embodiment.

Third Embodiment

In the above-mentioned first and second embodiments, the load torque of the compressor at the time of resuming the fuel supply is estimated at step S700 in FIG. 3, and the control current In is calculated so that the estimated value becomes the reference value To. According to a third embodiment, the control current In is calculated by a different method.

Figure 8:
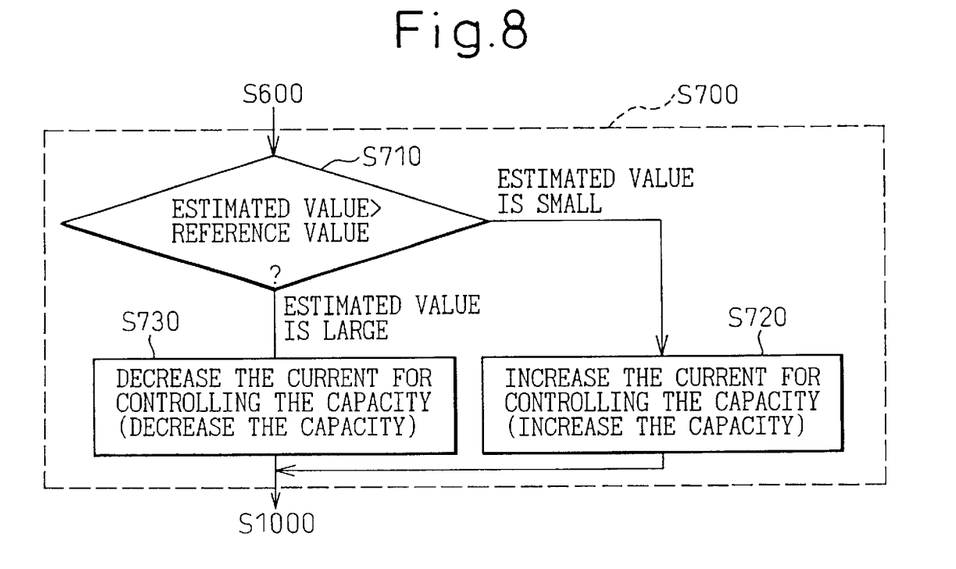
FIG. 8 is a flowchart illustrating the capacity control operation according to a third embodiment.

FIG. 8 illustrates the control operation at step S700 according to the third embodiment. At step S710, first, the relationship of the magnitudes of the estimated value of load torque of the compressor and of the reference value To are judged. When the estimated value is small, the routine proceeds to step S720 to increase the control current In by a predetermined ratio (e.g., by 10%) from the present control current at the time of cutting the fuel supply, thereby to increase the blow-out capacity of the compressor.

When the estimated value of load torque of the compressor is greater than the reference value To, due to some special cause, the routine proceeds to step S730 where the control current In is decreased by a predetermined ratio (e.g., by 10%) from the present control current at the time of cutting the fuel supply, thereby to decrease the blow-out capacity of the compressor.

Fourth Embodiment

Figure 9:
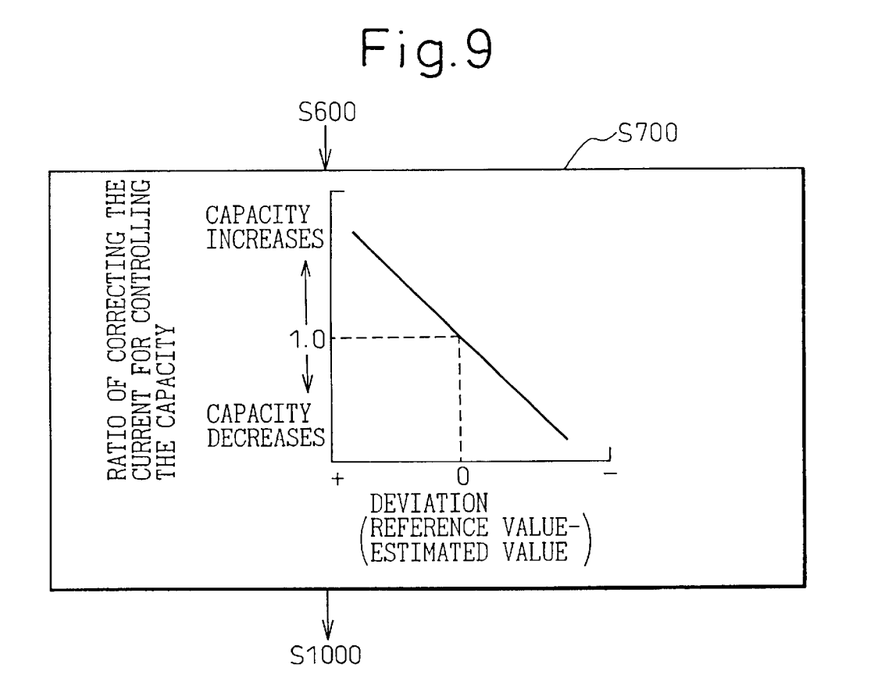
FIG. 9 is a flowchart illustrating the capacity control operation according to a fourth embodiment.

FIG. 9 illustrates the control operation at step S700 according to a fourth embodiment, wherein the abscissa represents the deviation between the reference value To and the estimated value of load torque of the compressor and the ordinate represents the ratio of correcting the control current In. The left side of "0" on the abscissa of FIG. 9 is a positive region of deviation (reference value To>estimated value), and the right side of "0" on the abscissa is a negative region of deviation (reference value To<estimated value).

The characteristics of FIG. 9 are set in advance in the form of a map and are stored in a memory means (e.g., ROM) of a computer. That is, a ratio of correction is found from a deviation between the reference value To and the estimated value of load torque of the compressor, and the present control current at the time of cutting the fuel supply is multiplied by the ratio of correction to calculate a control current In that has been corrected. The capacity is controlled by the corrected control current in.

According to the control operation using the map of FIG. 9, the control operations at steps S600, S700 and S800 of FIG. 3 can be executed in combination, together, by increasing and decreasing the ratio of correction.

In the first to fourth embodiments described above, the load torque of the compressor at the time of resuming the fuel supply is estimated, and the blow-out capacity of the compressor is changed depending upon the estimated value. The blow-out-capacity of the compressor is changed in order to change the blow-out rate of the coolant blown out from the compressor 1 (to change the flow rate per a unit time). Here, the blow-out rate can be expressed by a product of the blow-out capacity of the compressor 1 and the rotational speed of the compressor. It is therefore also allowable to change the blow-out rate of the coolant blown out from the compressor 1 by using the compressor 1 having a fixed blow-out capacity, by interposing a speed-change apparatus capable of varying the speed-change ratio continuously or in a multiplicity of steps between the compressor 1 and the engine 4 and by changing the speed-change ratio of the speed-change apparatus.

Concretely speaking, in the case that the speed-change ratio is compressor rotational speed (output rotational speed)/engine rotational speed (input rotational speed), the speed-change ratio is increased when it is desired to execute the control operation for increasing the blow-out capacity of the compressor in the above-mentioned first to fourth embodiment and, conversely, the speed-change ratio is decreased when it is desired to execute the control operation for decreasing the blow-out capacity of the compressor in the above-mentioned first to fourth embodiments, thereby to obtain the same function and effect as those of the above-mentioned first to fourth embodiments.

Fifth Embodiment

In the first to fourth embodiments described above, the load torque of the compressor at the time of resuming the fuel supply is estimated, and the blow-out capacity of the compressor (or the speed-change ratio of the speed-change apparatus for driving the compressor) is changed depending upon the estimated value. According to a fifth embodiment, however, the load torque of the compressor at the time of resuming the fuel supply is estimated, and the timing for resuming the fuel supply is changed depending upon the estimated value.

Figure 10:
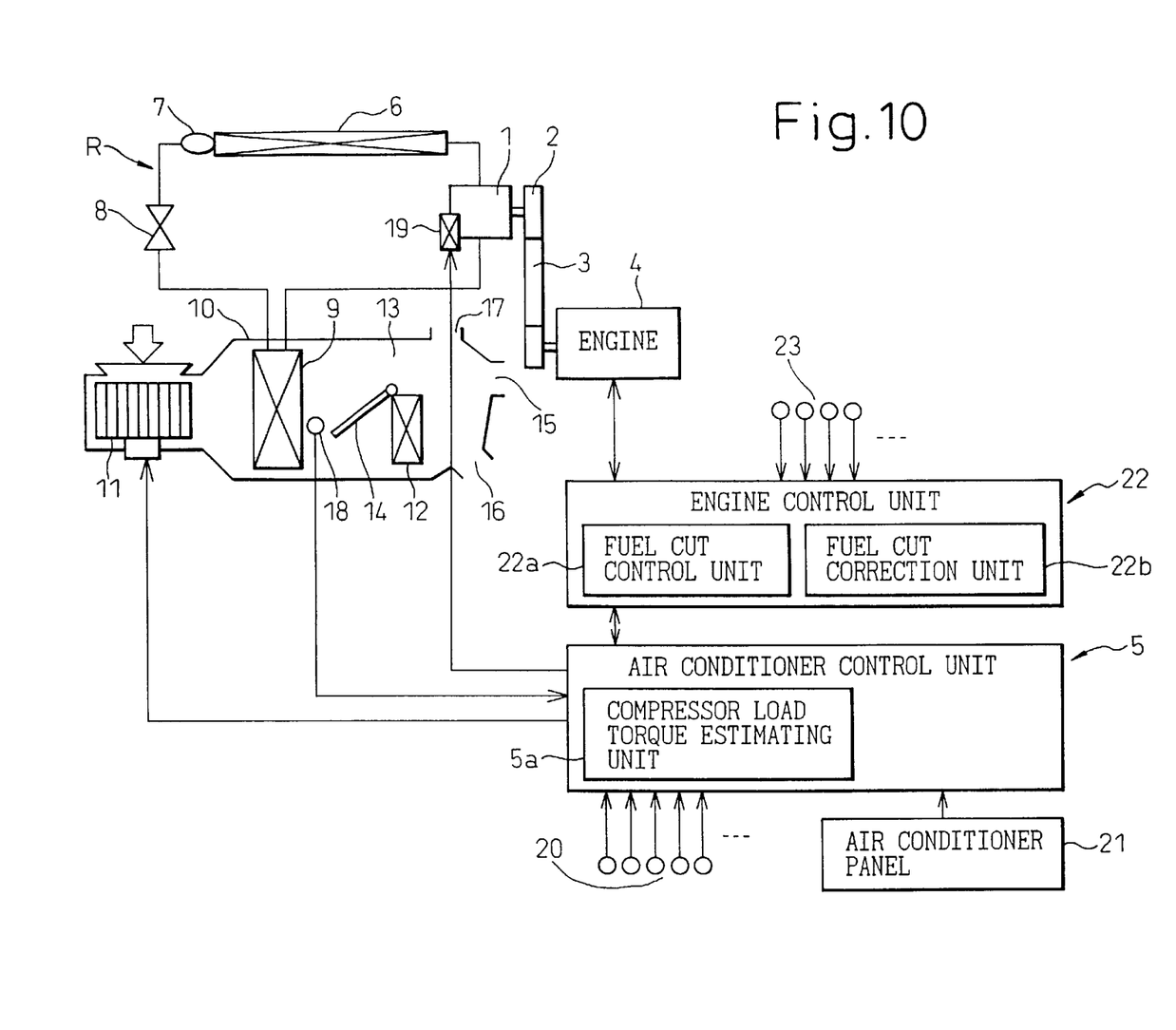
FIG. 10 is a diagram illustrating the whole constitution according to a fifth embodiment.

The fifth embodiment will now be described by placing emphasis on the differences from the first embodiment. FIG. 10 is a diagram illustrating the whole constitution according to the fifth embodiment, and wherein an engine control unit 22 is provided with a fuel cut correction unit 22b in addition to the fuel cut control unit 22a. The correction unit 22b corrects the timing for resuming the fuel supply (timing for resetting the cut of fuel supply) depending upon the output of the compressor load torque estimating unit 5a in the air conditioner control unit 5.

Figure 11:
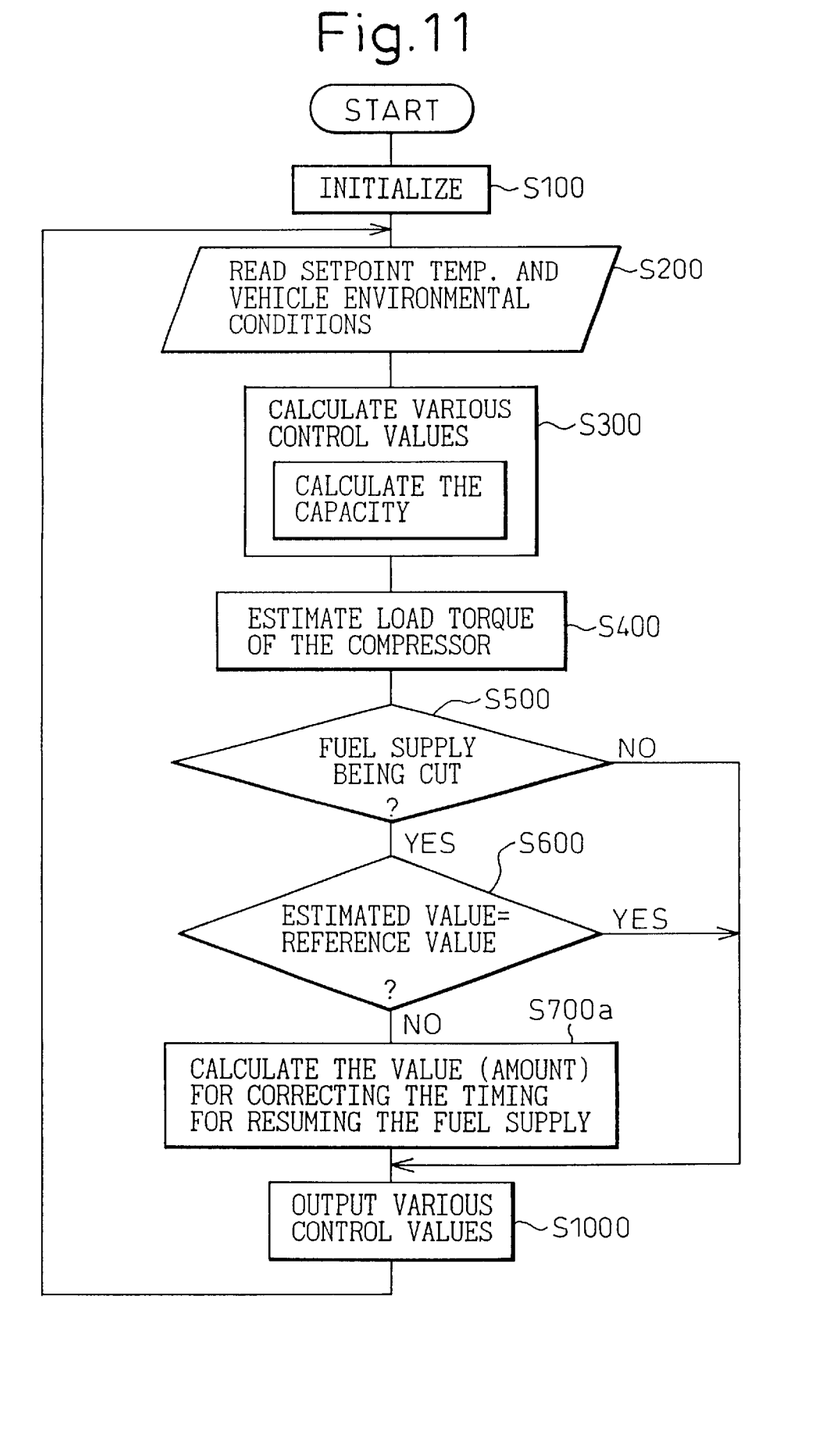
FIG. 11 is a flowchart illustrating the air-conditioning control operation according to the fifth embodiment.

FIG. 11 is a flowchart illustrating the control operation according to the fifth embodiment, wherein the same portions as those of FIG. 3 are denoted by the same reference numerals but their description is not repeated. At step S300, various control values are calculated in the same manner as at step S300 in FIG. 3. By using the control current In that is calculated at step S300 as a final value, the control operation for controlling the capacity of the compressor 1 (the control operation for controlling the capacity under the normal operation at step S900 in FIG. 3) is executed.

At step S700a in FIG. 11, the timing for resuming the fuel supply is controlled uniquely according to the fifth embodiment. Concretely speaking, the timing for resuming the fuel supply is controlled for correction in a manner as described below.

As described in the first embodiment, it can be considered that the power for driving the compressor (torque×rotational speed) is maintained constant during the deceleration that lasts for only a short period of time. In FIG. 6, therefore, if the present compressor load torque at a moment of estimation is T1, the compressor rotational speed is Nc1 and if the equidynamic line B of the compressor can be applied, then, the limit load torque of the compressor which permits the operation characteristics of the engine, 4 to be maintained in the favorable region E can be calculated to be To' from the intersecting point of the lines B and C.

That is, by setting the characteristics of FIG. 6 in advance and storing them in a memory means (ROM) of a computer, it is possible to select the equidynamic line B of the compressor from the present compressor load torque T1 and the compressor rotational speed Nc1 at the estimating timing, and to calculate the limit load torque To' of the compressor from the intersecting point of the lines B and C.

Based upon the limit load torque To' of the compressor that is calculated, the corresponding engine rotational speed can be found as Neo' from the characteristics of the lines B and C of FIG. 6. The engine rotational speed Neo' is lower, by a predetermined rotational speed Nα, than the engine rotational speed Neo corresponding to the reference value To that is determined based on the equidynamic line A of the compressor at the time of a maximum air-conditioning load, the predetermined rotational speed Nα being the amount for correcting the timing for resuming the fuel supply at step S700a.

The engine control unit 22 sets an interrupt control executed at a predetermined time interval during the control routine, reads the engine rotational speed Neo' calculated at step S700a in a manner of the interrupt control, resets the cut of fuel supply at the engine rotational speed Neo', and resumes the supply of fuel.

When the load torque of the compressor estimated at step S400 exceeds the reference value To, due to some special cause, that usually does not occur, the engine rotational speed (which is higher than Neo) found from an intersecting point of the estimated value and the line C is used as the corrected engine rotational speed Neo', the fuel cut is reset at an early time relying upon the engine rotational speed Neo', and the supply of fuel is resumed. This avoids, in advance, an occurrence that the engine operation characteristics plunge into the defective zone D in FIG. 5 while the fuel supply is being cut due to a too large load torque of the compressor and as a result that the engine stalls or the NVH characteristics are deteriorated.

According to this embodiment, therefore, when there is still a margin in the engine output, the engine rotational speed at the time when the fuel supply is resumed is pulled down by a predetermined amount Nα, whereby the fuel cut is maintained for an extended period of time to decrease the consumption of fuel. At the same time, as the amount for correcting the timing for resuming the fuel supply is determined based on the limit load torque To' of the compressor which enables the operation characteristics of the engine 4 to be maintained in the favorable zone E, the deterioration in the engine operation characteristics (driveability) that accompanies the fuel cut is reliably prevented.

The control operation for correcting the timing for resuming the fuel supply according to the fifth embodiment is irrelevant to the system for controlling the capacity of the compressor 1. In the fifth embodiment, therefore, the system for controlling the capacity of the compressor 1 may be either one of the first embodiment or the second embodiment. The fifth embodiment can similarly be executed even by maintaining the blow-out capacity of the compressor 1 constant and by intermittently operating the compressor 1 of the fixed capacity to vary the ability of the compressor 1.

Sixth Embodiment

In the above-mentioned fifth embodiment, the timing for resuming the fuel supply is corrected at step S700a of FIG. 11 so as to accomplish the limit load torque To' of the compressor which still enables the operation characteristics of the engine 4 to lie in the favorable zone E. According to a sixth embodiment, however, the timing for resuming the fuel supply is corrected by a different method.

Figure 12:
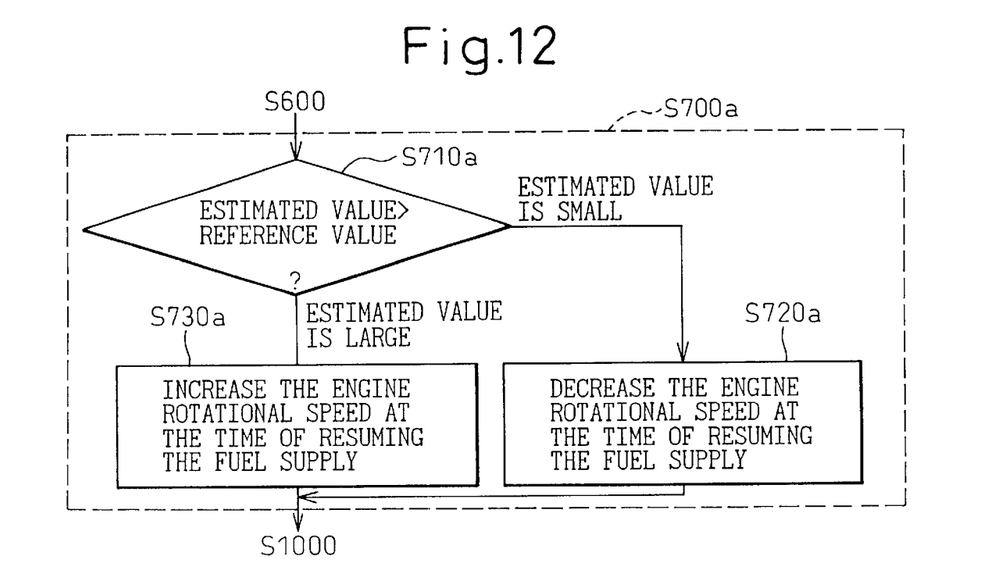
FIG. 12 is a flowchart illustrating the calculating operation of the engine rotational speed at the time of resuming the fuel supply according to a sixth embodiment; and, FIG. 13 is a flowchart illustrating the calculating operation of the engine rotational speed at the time of resuming the fuel supply according to a seventh embodiment.

FIG. 12 illustrates the control operation at step S700a according to the sixth embodiment. At step S710a, first, the relationship of the magnitudes of the estimated value and the reference value To of load torque of the compressor are judged. When the estimated value is small, the routine proceeds to step S720a where the engine rotational speed Neo at the time of resuming the fuel supply is lowered by a predetermined amount (e.g., 100 rpm) to lengthen the period in which the fuel remains cut.

When the estimated load torque of the compressor is larger than the reference value To, due to some cause, the routine proceeds to step S730a where the engine rotational speed Neo at the time of resuming the fuel supply is increased by a predetermined amount (e.g., 100 rpm) to advance the reset of fuel cut.

Seventh Embodiment

Figure 13:
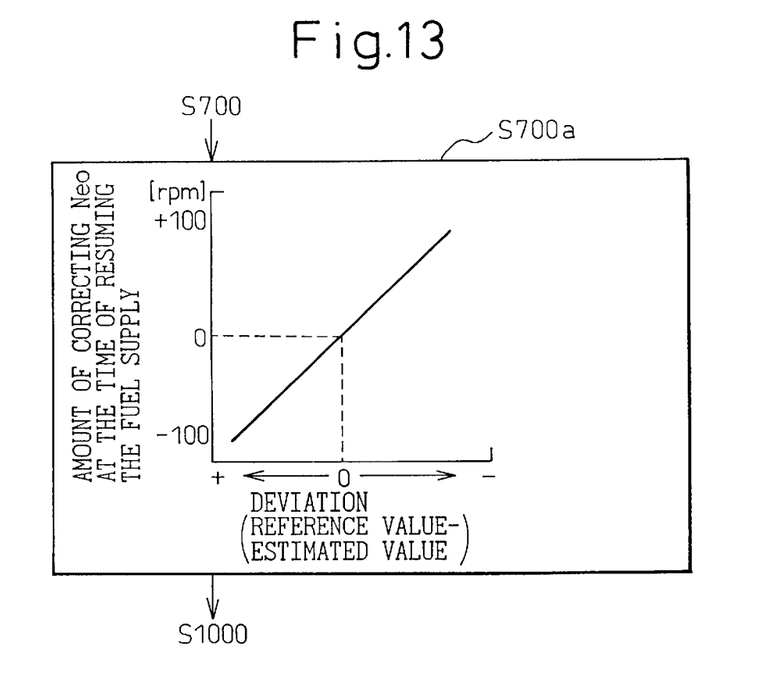

FIG. 13 illustrates the control operation at step S700a according to a seventh embodiment, wherein the abscissa represents the deviation between the reference value To and the estimated value of load torque of the compressor, and the ordinate represents the amount of correcting the engine rotational speed Neo at the time of resuming the fuel supply. The deviation along the abscissa of FIG. 13 is expressed in the same manner as that of FIG. 9.

The characteristics of FIG. 13 are set in advance in the form of a map and are stored in a memory means (e.g., ROM) of a computer. That is, the amount of correcting the engine rotational speed Neo is found from a deviation between the reference value To and the estimated value of load torque of the compressor, and is used for correcting the engine rotational speed Neo at the time of resuming the fuel supply determined based upon the reference value To of load torque of the compressor. Therefore, the seventh embodiment also exhibits the same function and effect as those of the fifth embodiment.

Other Embodiments

In FIG. 1, illustrating the whole constitution of the first embodiment, the air conditioner control unit 5 is provided with the compressor load torque estimating unit 5a and with the unit 5b for calculating the capacity when the fuel is cut. Instead, however, the engine control unit 22 may be provided with the compressor load torque estimating unit 5a and with the unit 5b for calculating the capacity when the fuel is cut. Similarly, in FIG. 10 illustrating the whole constitution of the fifth embodiment, the engine control unit 22 may be provided with the compressor load torque estimating unit 5a.

The above-mentioned embodiments all use the fuel cut signal FC sent from the engine control unit 22. It is, however, also allowable to obtain a fuel injection amount signal from the engine control unit 22 and render a judgment that the fuel supply is cut when the amount of fuel injection becomes smaller than a predetermined value.

While the invention has been described by reference to specific embodiments chosen for purpose of illustration, it should be apparent that numerous modifications could be made thereto by those skilled in the art without departing from the basic concept and scope of the invention.

What is claimed is:

1. An air-conditioning device for vehicles that cut the supply of fuel to a vehicle engine under predetermined conditions during the deceleration of the vehicle, comprising:

a compressor driven by said vehicle engine to compress and blow out a coolant in a refrigeration cycle;

blow-out rate varying means for varying the blow out rate of said compressor; and load torque estimating means for estimating a physical quantity related to the load torque of said compressor under a condition of resuming the fuel supply after the fuel supply has been cut; wherein the blow-out rate of said compressor is changed by controlling said blow-out rate varying means depending upon the estimated value of physical quantity output from said load torque estimating means.

2. An air-conditioning device for vehicles according to claim 1, wherein a reference value related to load torque of said compressor is set under the condition of resuming the fuel supply, and wherein the blow-out rate of said compressor is changed so that said estimated value of physical quantity approaches said reference value.

3. An air-conditioning device for vehicles according to claim 2, wherein said reference value is the load torque of the compressor at the time of resuming the fuel supply under the condition of a maximum air-conditioning load.

4. An air-conditioning device for vehicles according to claim 1, wherein a reference value related to load torque of said compressor is set under the condition of resuming the fuel supply, and wherein the blow-out rate of said compressor during the control operation for cutting the fuel supply is increased to be larger than the blow-out rate at the time when the control operation for cutting the fuel supply is started in the case that said estimated value of physical quantity is smaller than said reference value, and the blow-out rate of said compressor during the control operation for cutting the fuel supply is decreased to be smaller than the blow-out rate at the time when the control operation for cutting the fuel supply is started in the case that said estimated value of physical quantity is larger than said reference value.

5. An air-conditioning device for vehicles according to claim 4, wherein in the case that said estimated value of physical quantity is smaller than said reference value, the blow-out rate of said compressor during the control operation for cutting the fuel supply is forcibly brought to be a maximum blow-out rate.

6. An air-conditioning device for vehicles according to claim 1, wherein said load torque estimating means estimates said physical quantity based upon the physical quantity related to the load torque of said compressor and the rotational speed of said compressor at the time when the control operation for cutting the fuel supply is started, and upon the rotational speed of said compressor under the condition for resuming the fuel supply.

7. An air-conditioning device for vehicles according to claim 1, wherein the condition for resuming the fuel supply is a timing of when the rotational speed of the vehicle engine has dropped down to a predetermined rotational speed after the fuel supply has been cut.

8. A device for controlling an engine for a vehicle which cuts the fuel supply to a vehicle engine under a predetermined condition during the deceleration of the vehicle, and which mounts an air-conditioning device having a compressor that is driven by said vehicle engine, compresses the coolant in a refrigerating cycle and blows the coolant out, the device for controlling an engine for a vehicle comprising:

load torque estimating means for estimating a physical quantity related to the load torque of said compressor under a condition for resuming the fuel supply; and fuel supply resumption control means for changing the timing for resuming the fuel supply depending upon said estimated value of physical quantity output from said load torque estimating means.

9. A device for controlling an engine for a vehicle according to claim 8, wherein a reference value related to load torque of the compressor is set under the condition of resuming the fuel supply, and wherein in the case that the estimated value of physical quantity is smaller than said reference value, the timing for resuming the fuel supply is delayed so that the operation characteristics of the vehicle engine approach a border line between the defective zone and the favorable zone.

10. A device for controlling an engine for a vehicle according to claim 9, wherein said reference value is the load torque of the compressor at the time of resuming the fuel supply under the condition of a maximum air-conditioning load.

11. A device for controlling an engine for a vehicle according to claim 8, wherein a reference value related to load torque of said compressor is set under the condition of resuming the fuel supply, and wherein the timing for resuming the fuel supply is delayed behind the timing that is set based oh said reference value when said estimated value of physical quantity is smaller than said reference value, and the timing for resuming the fuel supply is advanced ahead of the timing that is set based on said reference value when said estimated value of physical quantity is larger than said reference value.

12. A device for controlling an engine for a vehicle according to claim 8, wherein said load torque estimating means estimates said physical quantity based upon the physical quantity related to the load torque of said compressor and the rotational speed of said compressor at the time when the control operation for cutting the fuel supply is started, and upon the rotational speed of said compressor under the condition of resuming the fuel supply.

* * * * *